(12) United States Patent
Ellis et al.

(10) Patent No.: US 10,977,223 B2
(45) Date of Patent: Apr. 13, 2021

(54) DATA STORAGE METHOD AND SYSTEM

(71) Applicant: Palantir Technologies Inc., Palo Alto, CA (US)

(72) Inventors: Joseph Ellis, London (GB); Jakub Kozlowski, London (GB); James Baker, London (GB); Mark Elliot, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 16/249,740

(22) Filed: Jan. 16, 2019

(65) Prior Publication Data

US 2020/0073859 A1    Mar. 5, 2020

(30) Foreign Application Priority Data

Aug. 28, 2018   (GB) ..................... 1813951

(51) Int. Cl.
*G06F 16/21* (2019.01)
*G06F 16/28* (2019.01)
*G06F 16/22* (2019.01)
*G06F 16/18* (2019.01)

(52) U.S. Cl.
CPC ........ *G06F 16/212* (2019.01); *G06F 16/1865* (2019.01); *G06F 16/2228* (2019.01); *G06F 16/2282* (2019.01); *G06F 16/289* (2019.01)

(58) Field of Classification Search
CPC ........ G06F 17/30607; G06F 17/30595; G06Q 10/10
USPC ................................................ 707/792
See application file for complete search history.

(56) References Cited

U.S. PATENT DOCUMENTS

| | | | | |
|---|---|---|---|---|
| 6,640,238 B1* | 10/2003 | Bowman-Amuah | ... | G06F 9/541 709/201 |
| 8,484,259 B1* | 7/2013 | Makkar | ............. | G06F 16/90335 707/827 |
| 2005/0076041 A1* | 4/2005 | Stakutis | ................ | G06F 16/148 |
| 2006/0173985 A1* | 8/2006 | Moore | .................. | G06F 19/325 709/223 |
| 2007/0083575 A1* | 4/2007 | Leung | .................... | G06F 16/122 |
| 2014/0365527 A1* | 12/2014 | Fuchs | ................. | G06F 21/6227 707/786 |
| 2015/0074070 A1* | 3/2015 | Bortnikov | ........... | G06F 16/2308 707/703 |
| 2017/0359379 A1* | 12/2017 | Elliot | ..................... | H04L 63/08 |

(Continued)

*Primary Examiner* — Mohammad S Rostami
*Assistant Examiner* — Robert F May
(74) *Attorney, Agent, or Firm* — Sheppard Mullin Richter & Hampton LLP (57) ABSTRACT

Example embodiments describe a data storage method and system. For example, the method described, performed by one or more processors, may comprise in an application for enforcing one or more policies for reading and writing data to a database receiving, over a data network, instructions for performing a read or write request for data, and sending the read or write request to a transaction manager for providing transactions for a key-value store of the database, the request being in accordance with one or more policies to be enforced by the enforcing application. The method may also comprise receiving, from the transaction manager, a response message based on operations performed by the transaction manager in response to the read or write request.

17 Claims, 6 Drawing Sheets

(56) References Cited

U.S. PATENT DOCUMENTS

2018/0089249 A1* 3/2018 Collins ............... G06F 16/2365
2019/0052621 A1* 2/2019 Sahraei ............... H04L 63/0807

* cited by examiner

FIG. 8

DATA STORAGE METHOD AND SYSTEM

TECHNICAL FIELD

Example embodiments relate to methods and systems for data storage.

BACKGROUND

A database is an organized collection of data which is stored and may be accessed electronically. Databases are used in virtually every commercial sector to store, organise and manage data relating to, for example, technical processes, data analysis and transformation processes, financial transactions and inventory management, to give a very limited number of examples.

Databases may be classified based on how they store data and/or how they are managed. Example classifications which are well-known are relational databases and non-relational (e.g. NoSQL) databases. Non-relational databases tend to be the preferred class where scalability and distribution of database storage nodes on multiple computer systems is needed. Such scalability and provision of distributed storage are factors that many modern database users require, particularly where databases hold large amounts of data which increase over time.

Another feature that modern database users require is transactional functionality. A transactional database is one that has the capability to roll-back or undo a requested database transaction if it is not completed correctly. However, the provision of a database and associated management system that is both scalable, distributed and handles transactions is not easy to implement and may present other difficulties in terms of managing data that may lead to poor performance in terms of speed and memory usage.

SUMMARY

According to a first aspect, there is provided a method, performed by one or more processors, the method comprising: in an application for enforcing one or more policies for reading and writing data to a database: receiving, over a data network, instructions for performing a read or write request for data; sending the read or write request to a transaction manager for providing transactions for a key-value store of the database, the request being in accordance with one or more policies to be enforced by the enforcing application; and receiving, from the transaction manager, a response message based on operations performed by the transaction manager in response to the read or write request.

The enforcing application may access one or more policy data objects defining the policies to be enforced.

One or more of the policy data objects may define one or more schemas to which the instructions should conform in order for the read or write request to be sent, and wherein sending occurs only if the instructions conform.

An error message may be returned to a computer system associated with the instructions if the instructions do not conform to the one or more schemas in the one or more policy data objects.

One or more of the policy data objects may define a predetermined file size, and wherein if the instructions are associated with writing a first file that is under said predetermined file size, sending the write request comprises sending the write request and the first file to the transaction manager for storing the first file as a value in the key-value store.

One or more of the policy data objects may define a predetermined file size, and wherein if the instructions are associated with writing a second file that is over said predetermined file size, the method further comprises storing the second file in secondary memory and sending the write request comprises sending the write request and the location of the second file in the secondary memory to the transaction manager for storing the location as a value in the key-value store.

Receiving the response message may comprise receiving from the transaction manager a key corresponding to the value in the key-value store.

If a subsequent received instruction is associated with reading the second file, a further, subsequent step may comprise sending a read request to the transaction manager, the read request including the key of the second file, receiving from the transaction manager the location of the second file corresponding to the key, and retrieving the second file from the secondary memory using said location.

The instructions may be received from one or more other applications of the data network, the other applications being at least partly configured to read and/or write data to the database via the transaction manager and key-value store, and wherein the method further comprises receiving one or more updated policies to be enforced by the enforcing application when receiving instructions from the one or more other applications.

The method may further comprise storing a range-scan table for caching an index associated with a subset of the keys in the key-value store.

The subset of keys may comprise common key parts.

The subset of keys may be determined based on prior range-scan requests.

A second aspect provides a computer program, optionally stored on a computable-readable medium, comprising instructions which when executed by a computer cause the computer to carry out a method in an application for enforcing one or more policies for reading and writing data to a database: receiving, over a data network, instructions for performing a read or write request for data; sending the read or write request to a transaction manager for providing transactions for a key-value store of the database, the request being in accordance with one or more policies to be enforced by the enforcing application; and receiving, from the transaction manager, a response message based on operations performed by the transaction manager in response to the read or write request. The second aspect may also provide a method according to any preceding method definition.

A third aspect provides a data processing apparatus configured to carry out a method according to any preceding method definition, the apparatus comprising one or more processors or special-purpose computing hardware.

A fourth aspect provides a data processing system configured to carry out the method of any preceding definition.

BRIEF DESCRIPTION OF DRAWINGS

Example embodiments will now be described, by way of non-limiting example, with reference to the accompanying drawings.

DETAILED DESCRIPTION

Example embodiments will be described for carrying out the subject matter of the present disclosure. In the following description, specific details are set forth in order to provide a thorough understanding of the subject matter. It shall be appreciated that embodiments may be practiced without some or all of these specific details.

Example embodiments relate to methods and systems for data storage, particularly in the context of databases. In this context, a database is any organized collection of data which is stored and may be accessed electronically. This accessing may be achieved by means of a computer instruction comprising for example a query derived from a client which may relate to one or more of reading, writing, transforming or managing data.

Example embodiments particularly relate to database management, whereby methods and systems control how such queries are processed as above in an efficient manner. Example embodiments of this database management relate to a scalable, transactional database architecture which may be implemented on one or more computer systems, i.e. using a distributed model. However, other embodiments are not limited to this form of database model.

Example embodiments may provide a database management method and system that interacts with a key-value database which employs key-value pairs acting as a form of dictionary or hash table. The database values may comprise one or more files, objects or records (hereafter "files") which are stored in a location on a memory of the database, and each value is paired with a key usable to retrieve or transform the value, which key can be referred to in the query to access the respective value. As is known, key-value pair databases are more flexible and scalable than their relational database counterparts, and tend to use far less memory to store the database, offering performance gains for certain workloads.

Example embodiments may provide a database management method and system that interacts with the key-value database via a transactional layer, being a hardware and/or software module that provides transactions, supporting the rolling-back or undoing of transactions if not completed appropriately.

Example embodiments may provide a database management method and system in the form of an application, which may be a microservice, that is, a lightweight application having a particular database-related function. Such an application may interact with other applications to provide overall functionality. For example, in an embodiment, a network of applications may be provided on a network for performing respective dedicated functions or groups of functions for clients using a database. For example, one such application may be dedicated to authentication and authorisation, to determine if a user is an authentic user for the purposes of using other applications and/or accessing the database, and authorised to access particular files or groups of files referred to in a query. Another such application may be a data integration service that provides sourcing, fusing and transforming of data into a required format. Another such application may be a version control service. Numerous other examples may be imagined.

In general, an application may be considered an application dedicated to a particular service or services associated with database data, and users may utilise said applications via a client and network to interact with the database data, either directly or via the network applications, in a flexible and useful way.

Example Computer System

Figure 1:
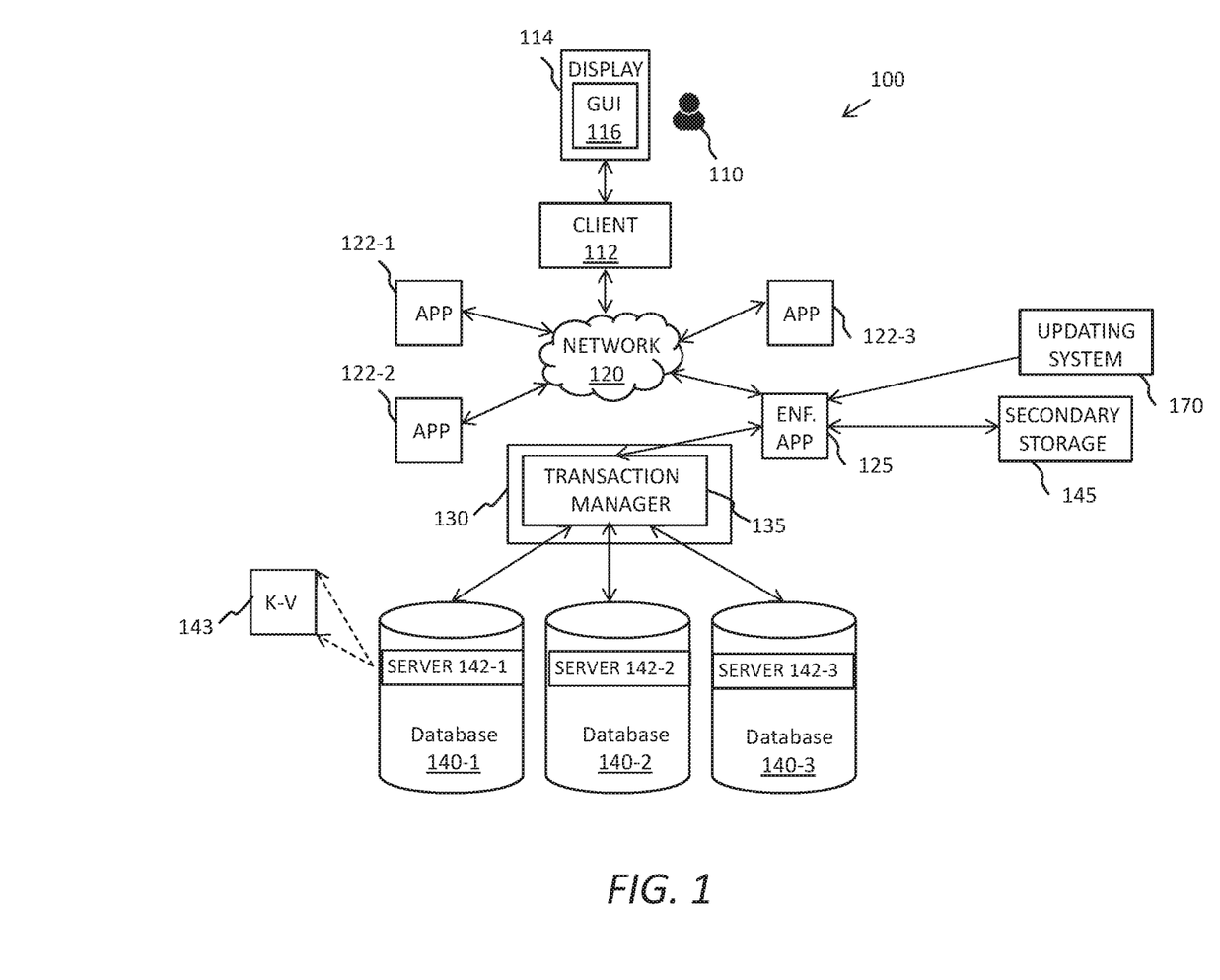
FIG. 1 is a block diagram of a computer network incorporating a computer system for operating according to an example embodiment.

FIG. 1 illustrates an example of a computer system 100 configured to perform method and systems described herein. As shown, the computer system 100 includes a client computing device 112 used by a human user 110, a server 130 and one or more memory devices that may provide individual databases 140-1, 140-2, 140-3 or a distributed database. The client computing device 112 and the server 130 may be configured to communicate with one another via a network 120. The network 120 may include the Internet, an intranet, a local area network, a wide area network, a wired network, a wireless network, and a virtual private network (VPN). For ease of understanding, various components of the system have each been described with reference to one or more computing devices. It should be noted that, in same embodiments, any number of these components may be collocated on the same computing device.

The client computing device 112 may for instance be a laptop computer, a desktop computer, a mobile phone, a personal digital assistant (PDA), a tablet computer, a netbook, a television with one or more processors, embedded therein or coupled thereto, a physical machine or a virtual machine. The client computing device 112 may include one or more of a keyboard, a mouse, a display 114, or a touch screen (of which display 114 may be a part of). For example, the client computing device 112 may be composed of hardware components like those of a basic computing device 500 described below with respect to FIG. 8. The client computing device 112 may also include a web browser or a client application configured to display, in a graphical user interface 116 of the client computing device 112, a computer program for accessing data. It may also allow the user to specify other operations that should be performed by the server 130. The graphical user interface 116 may be a web browser window, a client application window, an operating system window, an integrated development environment window, a virtual terminal window or other computer graphical user interface window. While only one user 110 and one client computing device 112 are illustrated in FIG. 1, the subject innovations may be implemented in conjunction with one or more users 110 and one or more client computing devices 112.

The server 130 may be implemented as a single server computing device or as multiple server computing devices arranged in a distributed or clustered computing arrangement. Each such server computing device may be composed of hardware components like those of basic computing device 500 described below with respect to FIG. 7. The server 130 includes a transaction manager 135 which may be an application, script or other executable file the operation of which will be described later on. In some embodiments, other software modules may be provided on the server 130.

The server 130 may include one or more processors (e.g. CPUs), a network interface, and memory. The processor(s) may be configured to execute computer instructions that are stored in one or more computer-readable media, for example, the memory of the server 130. The server 130 may include a network interface that is configured to allow the server 130 to transmit and receive data in a network, e.g., network 120 of FIG. 1. The network interface may include one or more network interface cards (NICs). The memory of the server 130 may store data or instructions. The instructions stored in the memory may include the transaction manager 135.

One or more applications 122-1, 122-2, 122-3, 125 may be connected to the network 120 for performing one or more functions associated with data in the databases 140-1, 140-2, 140-3. The one or more applications 122-1, 122-2, 122-3, 125 may be microservices, or similar applications dedicated to a particular service or services associated with database data, and users may utilise said applications via a client and network to interact with the database data in a flexible and useful way.

For example, a first application 122-1 may be configured for performing user authentication and authorisation. A second application 122-2 may be configured for performing data integration for one or more of sourcing, fusing and transforming data in the one or more databases 140-1, 140-2, 140-3 into a required format. A third application 122-3 may be configured for performing a further database-related task. The user 110 wishing to perform some task or query on data in the one or more databases 140-1, 140-2, 140-3 may utilise the first to third applications 122-1, 122-2, 122-3. This use may be restricted to particular users, for example by initially requiring tasks or queries to use the first application 122-1 for user authentication and authorization, prior to enabling use of the other applications 122-2, 122-3.

A further, fourth application 125 is configured to provide a centralized management and/or control service. It is hereafter referred to as an enforcement application 125, as its role may be to enforce certain conditions, such as schemas and/or the size of files that may be written to the databases 140-1, 140-2, 140-3. Functions associated therewith will be described later on.

The transaction manager 135 is configured to manage transactions. As will be explained, the transaction manager 135 and the enforcement application 125 may be part of the same application, the latter application ensuring that requests or transactions conform to one or more predetermined policies prior to allowing interaction with the transaction manager 135 or the one or more underlying databases 140-1, 140-2, 140-3. A transaction is a unit of work, i.e. one or more of an update, read, deletion, transformation and write operation, to be performed by a data management system in response to user requests. The data contained in a transaction may correspond to a portion of a data object, a single data object or a plurality of data objects. For example, the data management system may be a system comprising the server 130 and the one or more databases 140-1, 140-2, 140-3. While the one or more individual databases 140-1, 140-2, 140-3 can provide transactions, using the transaction manager 135 enables transactions to be implemented across a distributed database system which is provided over plural machines or locations.

Transactions enable roll-back, or recovery or undoing, from failures by ensuring that the data management system is kept consistent when failures occur. Transactions also ensure the data management system is kept consistent when multiple programs attempt to access the data management system simultaneously. This is achieved by four properties of transactions known as ACID: Atomicity, Consistency, Isolation and Durability.

Atomicity refers to transactions being "all-or-nothing", or atomic, meaning that a transaction either completely succeeds or fails. If a transaction succeeds, all operations included in the transaction are completed. If a transaction fails, no visible change is made to the data management system, so it appears to external systems, such as the client 112, accessing the system after the transaction has failed that no operation has been attempted. Transaction failure may occur for a number of reasons, e.g. power failure, faulty code or application failure.

Consistency refers to (successful) transactions only changing data stored by the data management system in allowed ways. The allowed ways that the database can change may be constrained by any number of primary key constraints, data type constraints, foreign key constraints, unique constraints and assertion statements. If a transaction results in a state that violates any of these constraints, the transaction is not successful and results in a transaction failure, so it is as if no operation has been attempted.

Isolation refers to work taking place inside a transaction being invisible to other operations, i.e. other transactions, running concurrently. This property ensures data is only seen in a consistent state, i.e. before or after a transaction has completed. Without isolation, data read by a second transaction while a first transaction was underway would be incorrect. For example, the first transaction may represent a bank transfer and so increment one bank balance then decrement another bank balance. If a second transaction was able to read these bank balances half-way through the first transaction, the first bank balance would be incremented but the second bank balance would not yet be decremented. It would, therefore, appear to the second transaction that money had appeared from nowhere. Isolation prevents these scenarios from occurring.

Durability refers to all successful transactions being permanently stored, i.e. stored in non-volatile memory, e.g. to a hard disk drive or solid state drive. The transaction is not considered successful until this has occurred, and if this is prevented from occurring, e.g. by a disk failure, the transaction is deemed to have failed, and no visible change is made to the data management system.

Each of the one or more databases 140-1, 140-2, 140-3 may include one or more processors (e.g., CPUs), a network interface, and memory. The processor(s) may be configured to execute computer instructions that are stored in one or more computer-readable media, for example, a memory of each database. The databases 140-1, 140-2, 140-3 may each include a network interface configured to allow each database 140-1, 140-2, 140-3 to transmit and receive data in one or more networks, e.g., a network connecting the server 130 and the databases, which may be the same or different network as the network that connects the server 130 and the client 112. The network interface may include one or more network interface cards (NICs). The memory of each database 140-1, 140-2, 140-3 may store data or instructions. The instructions stored in each memory may include a database server module 142-1, 142-2, 142-3. While three databases 140-1, 140-2, 140-3 are shown, any number of databases and database server modules may be used 142-1, 142-2, 142-3.

The database servers 142-1, 142-2, 142-3 may be any database serving application capable of providing reliable storage. In many embodiments, the database servers 142-1, 142-2, 142-3 are the same database serving application, but this is not essential provided all can be accessed and managed by the transaction manager 135. One or more of the database servers 142-1, 142-2, 142-3 may be a key-value store 143, such as CassandraDB, Oracle NoSQL or LevelDB. One or more of the database servers 142-1, 142-2, 142-3 may be a document-oriented database, such as MongoDB or CouchDB. One or more of the database servers 142 may be a Structured Query Language (SQL) database such as Oracle® database, MySQL database, PostgreSQL database or Microsoft® SQL server.

In many embodiments, the database servers 142-1, 142-2, 142-3 are distributed database serving applications, e.g. CassandraDB or MongoDB. This is not as essential as distributed data management may be provided by the transaction manager 135. However, using a distributed database serving application enables fault tolerance and/or horizontal scalability, and the transaction manager 135 need only provide the distributed transaction functionality.

Figure 2:
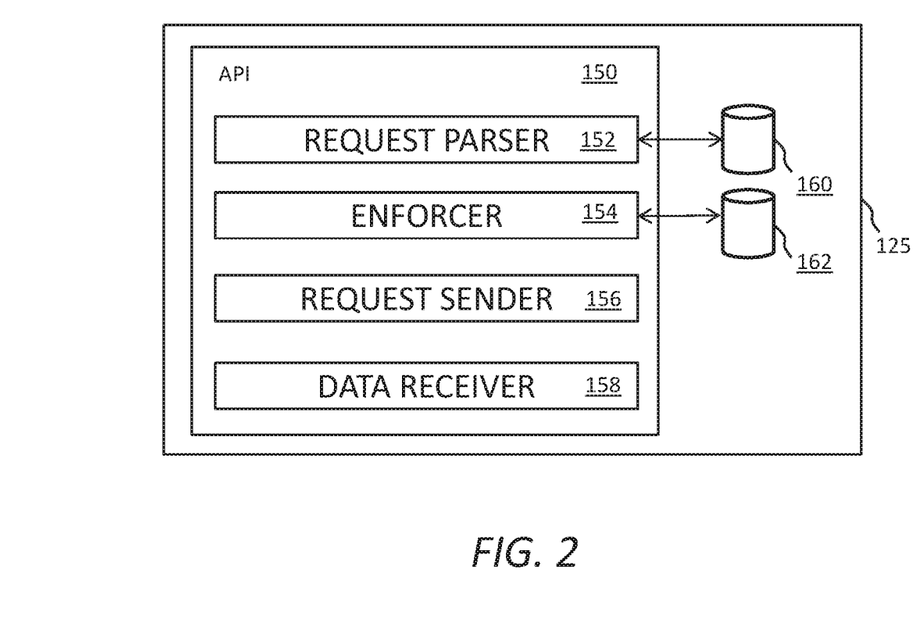
FIG. 2 is a schematic block diagram of an Application Programming Interface of a computer system according to an example embodiment.

Referring to FIG. 2, the enforcement application 125 comprises in Application Programming Interface (API) 150, which includes a request parser 152, an enforcer 154, a request sender 156, and a data receiver 158. Each of these modules, 150, 152, 154, 156, 158 may be implemented in software and may be combined into a single module. A greater or fewer number of modules may be provided.

In overview, the enforcement application 125 is an application that enforces certain policies via the API 150 to ensure that, for example, one or more predefined schemas and/or operations are conformed with and/or one or more file size writes are handled appropriately. The enforcement application 125 may enforce one or more predefined schemas and/or operations that is or are known to be performant in terms of, for example, reducing the processing burden (and developers' burden) when modelling application data and/or in providing predictable and consistent results. For example, for range scan requests with respect to key-value pairs in a database, a schema which appears to use computational resources efficiently may not actually work well as the number key/value pairs in the database increases, and hence system performance degrades. Hence, it may be appropriate to enforce schemas and/or operations that is or are known to work for range scans for small or large numbers of key/value pairs.

In other words, instructions from the client computing device 112 and or from one or more of the applications 122-1, 122-2, 122-3 may have to conform with certain policies set-out in the enforcement application 125 in order to interact with data in the one or more databases 142-1, 142-2, 142-3. For example, the request parser 152 may be associated with a first policy database 160 and the enforcer 154 may be associated with a second policy database 162. The first and second policy databases 162 may comprise memory of any suitable form and the policies within them may be provided in any suitable data format, for example as scripts, code, or logic defining preconditions or rules. These may be termed policy objects.

The API 150 provides a set of functions and procedures that enable clearly defined methods of communication between client computers, such as the client computing device 112, and the one or more databases 142-1, 142-2, 142-3. Thus, the API 150 may expose an interface to the user 110 that provides visual feedback as to whether their instructions to the one or more databases 142-1, 142-2, 142-3 are suitable. If not, for example, an error message may be returned and the instruction will not be executed.

One functional module of the API 150 is the request parser 152, which parses instructions received from the client computing device 112 to convert the instruction from a received format to a further format readable by the enforcer 154. Updates to the request parser 152 may be received from an updating means, such as a computer terminal associated with an administrator or other authorized entity associated with the enforcement application 125 and/or the one or more databases 140-1, 140-2, 140-3. Updates may be policy updates which are stored in the first policy database 160. Updates may be in the form of modified or replacement policy objects.

The enforcer 154 is configured to enforce other policies which are stored in the second policy database 162, which may be in the form of policy objects. For example, the enforcer 154 may enforce one or more schemas. A schema in this context means a database schema, which describes in a formal language its structure or organization as supported by the transaction manager 135 and/or the database servers 142-1, 142-2, 142-3. If a received instruction does not conform to the one or more schemas, an error message may be returned and the instruction may not be executed. Updates to a schema policy in the second policy database 162 may be received from an updating means, such as a computer terminal associated with an administrator or other authorized entity associated with the enforcement application 125 and/or the one or more databases 140-1, 140-2, 140-3. As another example, the enforcer 154 may enforce where data is stored based on the size of the data, e.g. a data file, array or other object. For example, if the received instruction requests the writing of a file above a predetermined size to one of the databases 140-1, 140-2, 140-3, then the enforcer 154 may be configured to write the file in a memory that is outside of the said database, i.e. in secondary storage 145, thereby to avoid the transaction manager 135 being overloaded with large amounts of data. In this respect, when handling large numbers of instructions for potentially large numbers of users, the transaction manager 135 may become a bottleneck in terms of data flow, slowing the processing of instructions down considerably for other users. Therefore, use of the secondary storage 145 may involve writing the location of the data in the secondary storage 145 as the value in the key-value store 143 provided by the one or more database servers 142-1, 142-2, 142-3. In this way, the key of the key-value store 143 may still refer to, and enable retrieval of, larger data files stored in the secondary storage 145, but without taking up valuable resources of the transaction manager 135. The secondary storage 145 may be any form of memory, and is accessed by the enforcer application 125 rather than via the transaction manager 135. The secondary storage 145 may be referred to as blob storage and may be located, for example, in the cloud or elsewhere. The predetermined file size may be stored in the second policy database 162 as a file size policy object. File sizes below said predetermined size may be stored in the one or more database servers 142-1, 142-2, 142-3. Updates to the file size policy object in the second policy database 162 may be received from an updating means, such as a computer terminal associated with an administrator or other authorized entity associated with the enforcement application 125 and/or the one or more databases 140-1, 140-2, 140-3. Updates may be in the form of updates or replacement policy objects.

The request sender 156 is configured to send requests to other parts of the FIG. 1 system. The data receiver 158 is configured to receive data from other parts of the FIG. 1 system.

In operation, the enforcement application 125 is configured to receive instructions for data storage (writes, or puts) and/or retrieval (reads, or gets) from the client computing device 112, or from one or more of the other applications 122-1, 122-2, 122-3, and to forward these instructions to the transaction manager 135, provided they can be parsed and meet whatever rules are being enforced by the enforcer 154.

In this respect, it will be appreciated that forwarding instructions may involve some transforming of the instructions from one format to another, due to the function of the API 150 and particularly the request parser 152. For ease of explanation, however, we refer to forwarding on the basis that the same read or write request (in whatever format) is being passed on.

The enforcement application 125 receives the instructions from the client computing device 112 using any suitable mechanism, e.g. a remote procedure call (RPC), a Representational State Transfer (REST) service call or a message queue event. These received instructions contain details of the data to be stored, deleted, updated and/or retrieved. In the case of data storage and updating, the data to be stored or updated is either included in the instruction or retrieved by the enforcement application 125 in a subsequent operation. The enforcement application 125 may transform the instructions and included or retrieved data in to a format understandable by the transaction manager 135, and then communicates the transformed instructions and data to the transaction manager using any suitable mechanism. For example, the enforcement application 125 communicates the transformed instructions and data via a function call, a remote procedure call (RPC), a REST service call, a message queue, or inter-process communication (IPC). On completion of the instruction, if data is returned, i.e. in the case of a data retrieval operation, the data may be returned by any of these same mechanisms.

As will be appreciated from the above, by providing an enforcement application 125 on the network 120, a centralized system is provided whereby parsing rules, and/or enforcement policies may be implemented and updated, as indicated in FIG. 1, by an updating system 170. This means that changes implemented at one or more of the transaction manager 135, and the database servers 142-1, 142-2, 142-3, or indeed anywhere downstream of the transaction manager, do not require each of the other applications 122-1, 122-2, 122-3 or any software at the client 112 to be changed, which is time-consuming and may be technically challenging, particularly where a database ecosystem comprises large numbers of applications. Rather, the applications 122-1, 122-2, 122-3 are required to conform to one or more policies set in the enforcement application 125, and these can be set centrally, using only one or a limited number of updating communications. As mentioned, this also means that potential bottlenecks can be avoided, by limiting the size of data to be written or read to the databases 140-1, 140-2, 140-3 and/or by only passing instructions that meet one or more schemas.

Figure 3:
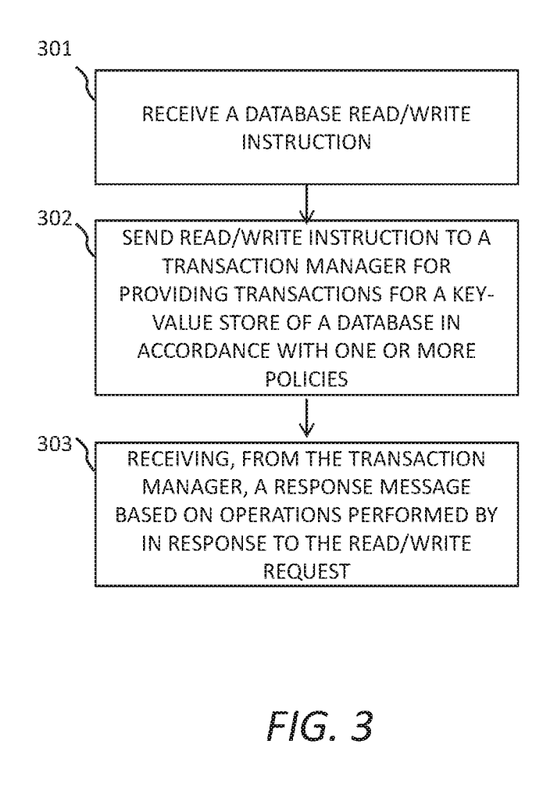
FIG. 3 is a flow diagram indicating processing operations of an example embodiment in response to receiving a database instruction.

FIG. 3 is a flow diagram illustrating example operations that may be performed at the enforcement application 125 in accordance with example embodiments. Some operations may be omitted and some other operations may be added. The numbering of operations is not necessarily indicative of the order of processing.

An operation 301 comprises receiving a database read or write instruction, in any suitable form and from any suitable client or computing or processing machine in FIG. 1.

Another operation 302 may comprise sending the read or write operation (which may also mean an operation in a different format derived from the read or write operation in operation 301) to a transaction manager for providing transactions for a key-value store of a database in accordance with one or more policies.

Another operation 303 may comprise receiving, from the transaction manager, a response message (in any suitable form) based on operations performed in response to the read or write request. In the case of a write operation, this may be a confirmation that the write occurred or did not occur. In the case of a read operation, this may be the value of the requested data.

Figure 4:
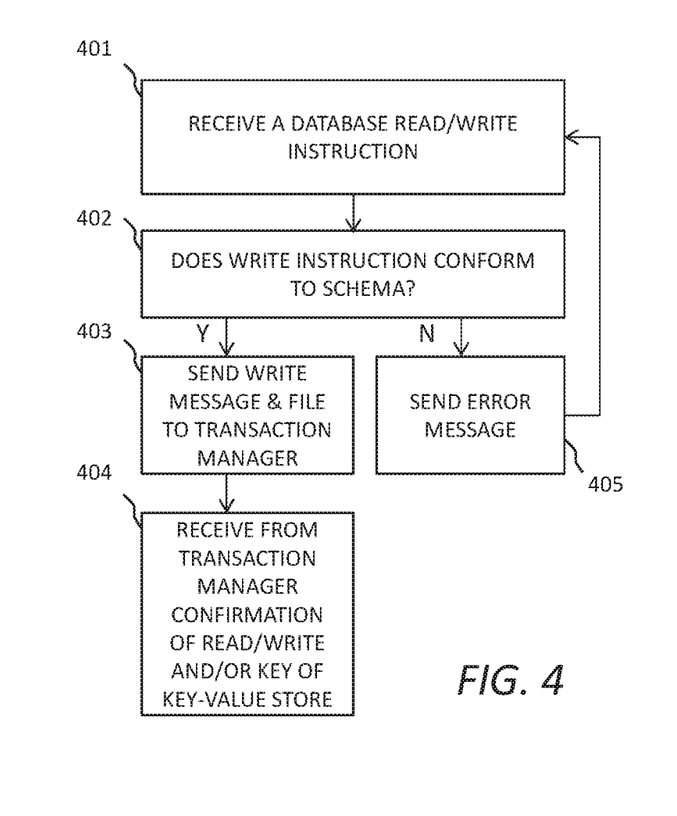
FIG. 4 is a flow diagram indicating processing operations of another example embodiment in response to receiving a database instruction.

FIG. 4 is a flow diagram illustrating example operations that may be performed at the enforcement application 125 in accordance with a more detailed example embodiment. Some operations may be omitted and some other operations may be added. The numbering of operations is not necessarily indicative of the order of processing.

An operation 401 comprises receiving a database read or write instruction, in any suitable form and from any suitable client or computing or processing machine in FIG. 1.

An operation 402 comprises determining if the instruction conforms to one or more predetermined schemas.

An operation 403, responsive to a positive determination, sends the read or write message to the transaction manager.

An operation 404, following operation 403, may comprise receiving, from the transaction manager, a response message (in any suitable form) confirming the read or write and/or the key of the key-value store.

Responsive to a negative determination in operation 402, operation 405 may send an error message and the process returns to operation 401.

Figure 5:
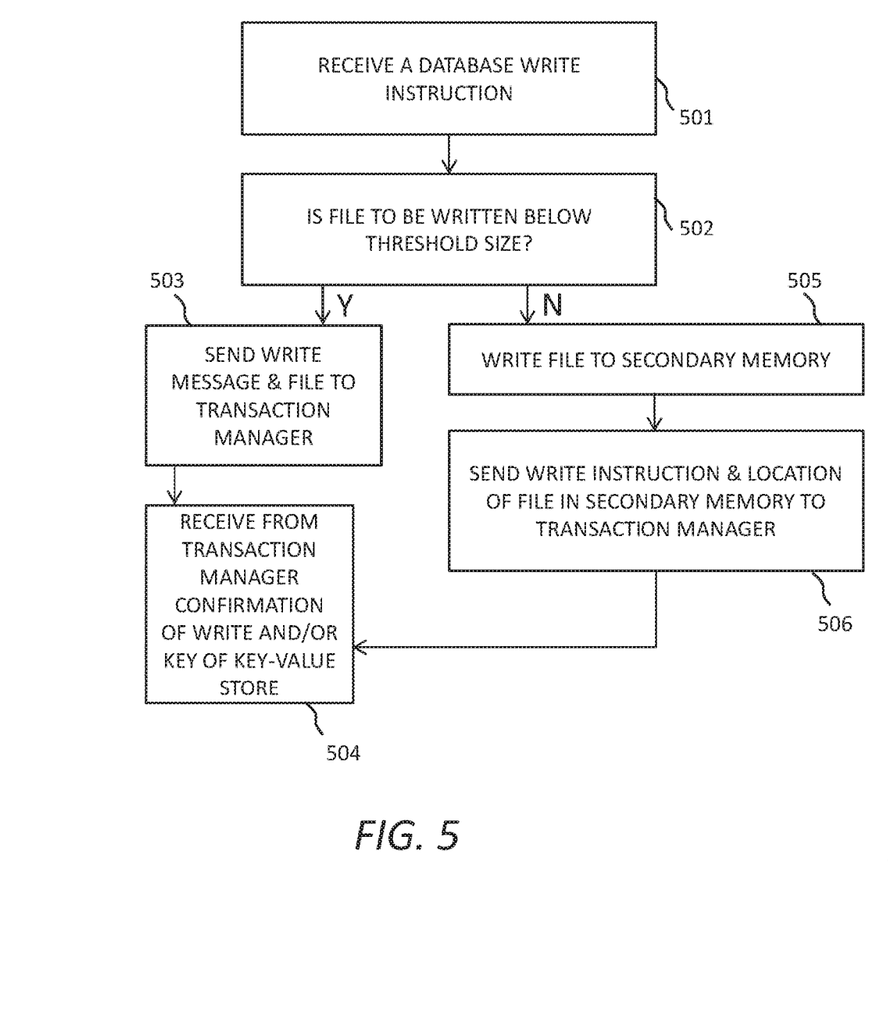
FIG. 5 is a flow diagram indicating processing operations of an example embodiment in response to receiving a database write instruction.

FIG. 5 is a flow diagram illustrating example operations that may be performed at the enforcement application 125 in accordance with a more detailed example embodiment. Some operations may be omitted and some other operations may be added. The numbering of operations is not necessarily indicative of the order of processing.

An operation 501 comprises receiving a database write instruction, in any suitable form and from any suitable client or computing or processing machine in FIG. 1.

Another operation 502 may comprise determining if the file (in any suitable form) is below a predetermined size.

An operation 503, responsive to a positive determination, sends a write message and the file to the transaction manager.

An operation 504, following operation 503, receives from the transaction manager a confirmation of the write and/or a key from the key-value store.

Responsive to a negative determination in operation 502, operation 505 may write the file to secondary memory, i.e. not to the intended database.

An operation 506, following operation 505, may comprise sending a write instruction and the location of the file in secondary memory to the transaction manager. The process may then return to operation 501.

Figure 6:
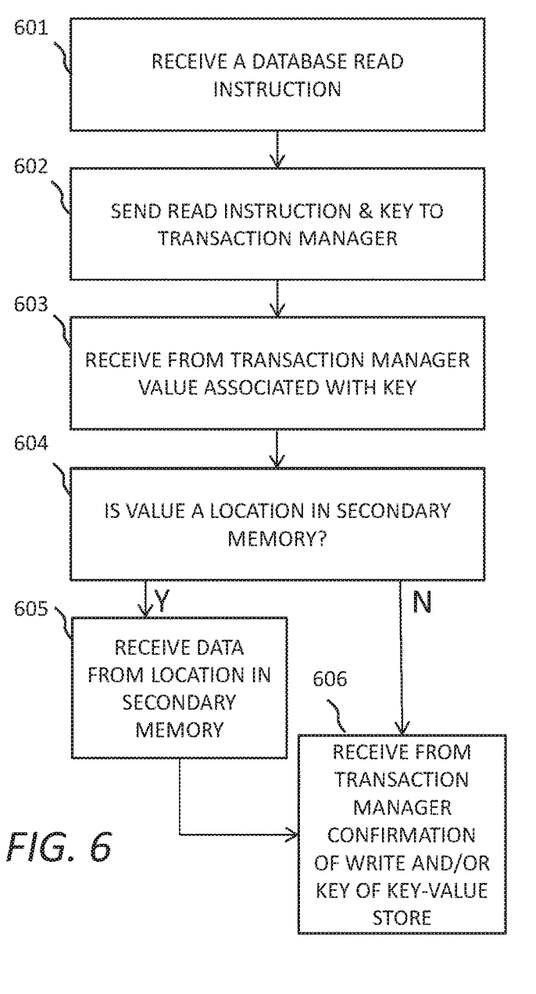
FIG. 6 is a flow diagram indicating processing operations of another example embodiment in response to receiving a database read instruction.

FIG. 6 is a flow diagram illustrating example operations that may be performed at the enforcement application 125 in accordance with a more detailed example embodiment. Some operations may be omitted and some other operations may be added. The numbering of operations is not necessarily indicative of the order of processing.

An operation 601 may comprise receiving a database read instruction, in any suitable form and from any suitable client or computing or processing machine in FIG. 1.

Another operation 602 may comprise sending the read instruction and associated key to the transaction manager.

Another operation 603 may comprise receiving from the transaction manager a value associated with the key.

Another operation 604 may comprise determining if the value is a location in secondary memory. For example, the value may be a URL.

Another operation 605, responsive to a positive determination in operation 604, may comprise receiving the data from the location in secondary memory.

Another operation 606, which may follow operation 605, may comprise receiving from the transaction manager confirmation of the write and/or the key of the key-value store.

In the event of a negative determination in operation 604, the process may go directly to operation 606.

Another example embodiment may comprise the enforcement application 125 further being configured to manage range-scan operations in an efficient manner on the transactional, distributed database architecture shown in FIG. 1. As is known, a range-scan is an instruction whereby a user or client specifies a query that covers a range of key values and will generally not return only one value. For example, database query instruction may ask for all values for surnames beginning "S" or for all keys having fixed parts, e.g. values for all keys with key parts A and B, where key part C is unknown.

Figure 7:
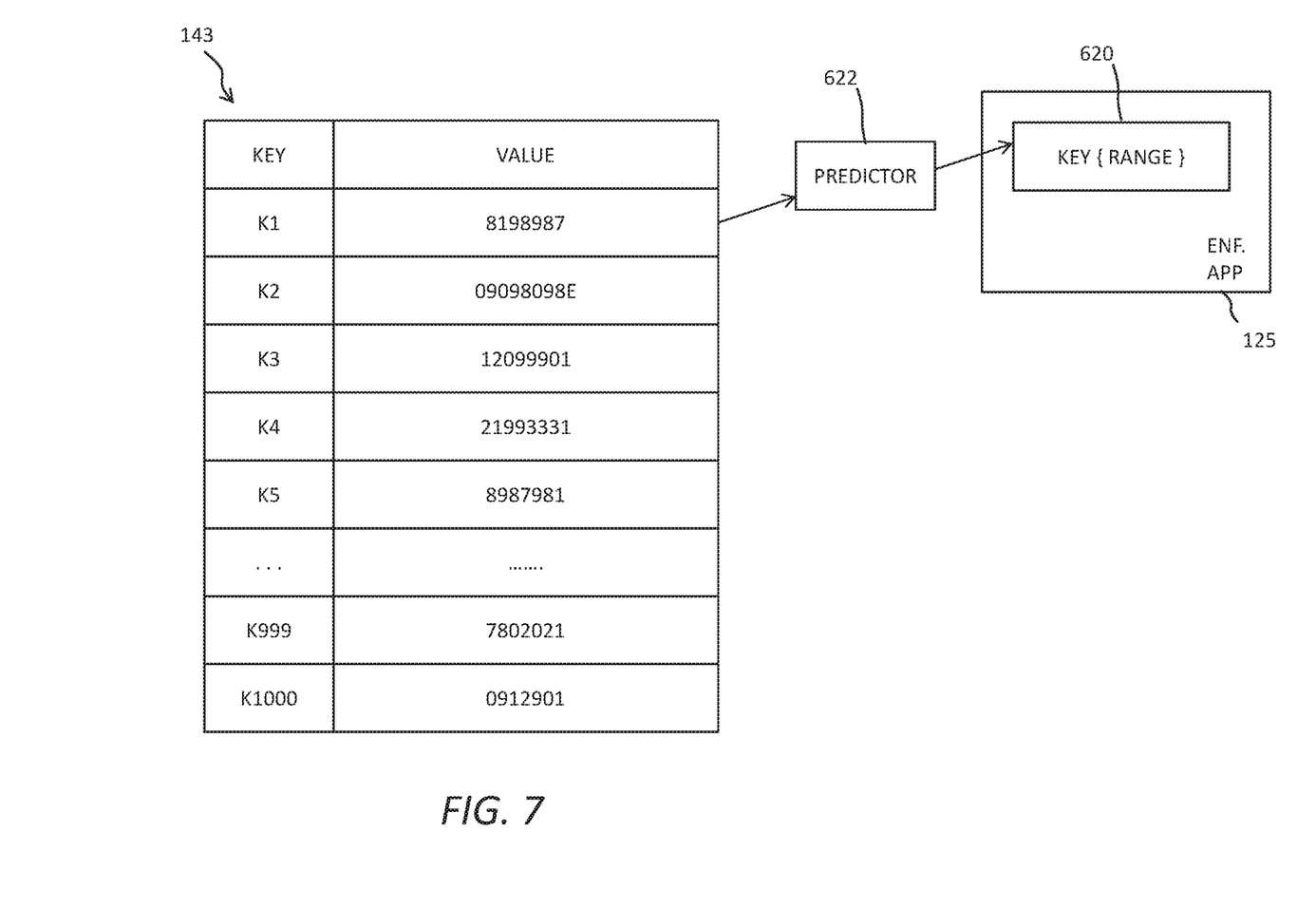
FIG. 7 is a schematic diagram of a key-value pair table and range-scan cache, for use in another example embodiment.

In example embodiments, and with reference to FIG. 7, the enforcement application 125 may periodically store (locally, and/or outside of the one or more databases) an index corresponding to a sub-set 620 of the keys that match specified range values, effectively caching them. The index corresponding to sub-set 620 may be selected based on an algorithm of a prediction module 622 which predicts, for example based on previous range scan operations and/or which values are frequently accessed. The predictions determine what is cached in the subset 620. The purpose is to pre-store an index of key-value pairs outside of the transactional database area, i.e. upstream of the transaction manager 135, thereby avoiding the aforementioned bottleneck problem. Range-scan operations have the potential to return large numbers of values, inevitably slowing down the database, possibly significantly. By caching a selected index, and refreshing periodically, the range-scan queries can be handled efficiently. The transaction manager 135 may need to know about reads and writes in order to have a consistent snapshot of the databases 140-1, 140-2, 140-3.

For example, if a first table stores many records corresponding to people objects, including first name, surname and other data for each person object, we may cache an index based on frequently accessed objects for a given surname. If we query the cached index with a given surname, we may get back a smaller list (potentially just one) of first names and can then go back to the first table to lookup specific values for the required object or objects.

Example Computing Device

Figure 8:
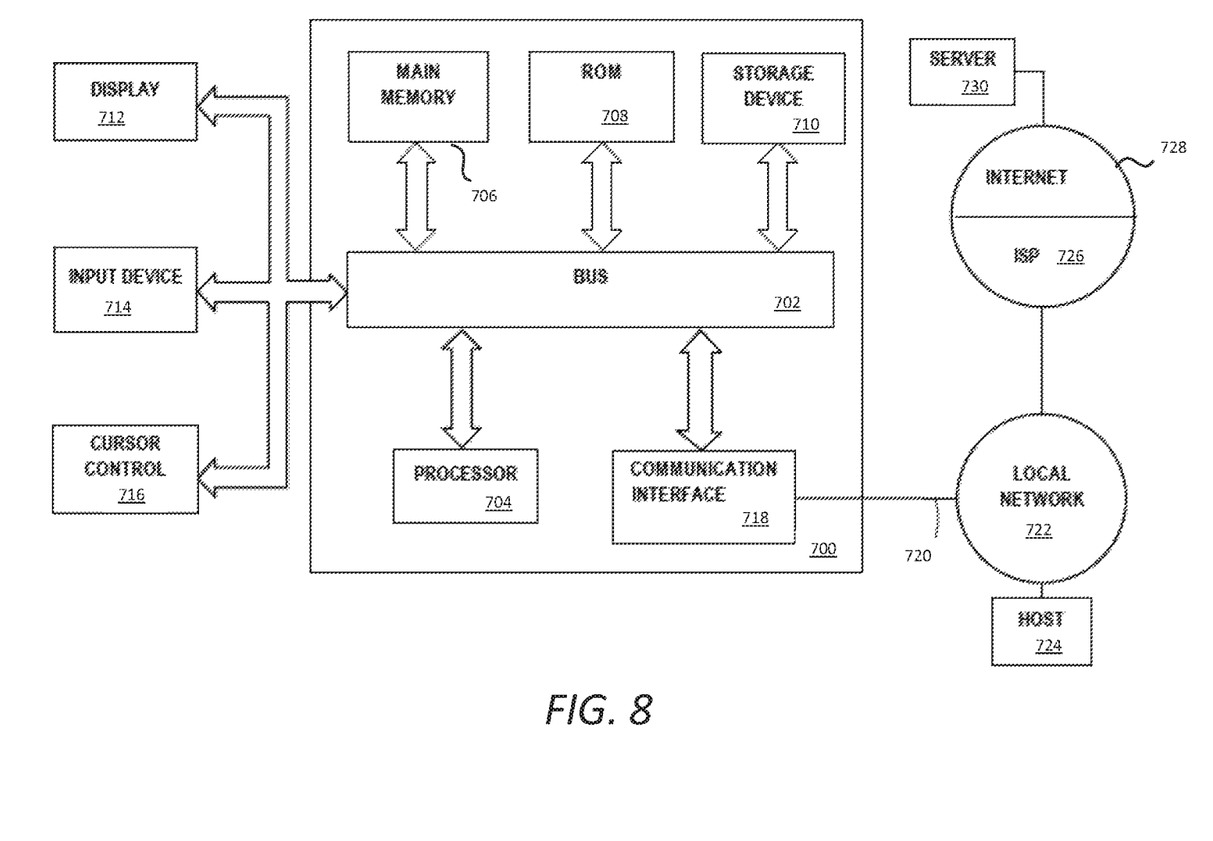
FIG. 8 is block diagram of a computing device that may be employed in the example embodiments.

Referring now to FIG. 8, it is a block diagram that illustrates a computing device 700 in which software-implemented processes of the subject innovations may be embodied. Computing device 700 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 700 may include a bus 702 or other communication mechanism for addressing main memory 706 and for transferring data between and among the various components of device 700.

Computing device 700 may also include one or more hardware processors 704 coupled with bus 702 for processing information. A hardware processor 704 may be a general purpose microprocessor, a system on a chip (SoC), or other processor suitable for implementing the subject innovations.

Main memory 706, such as a random access memory (RAM) or other dynamic storage device, also may be coupled to bus 702 for storing information and instructions to be executed by processor(s) 704. Main memory 706 also may be used for storing temporary variables or other intermediate information during execution of software instructions to be executed by processor(s) 704.

Such software instructions, when stored in non-transitory storage media accessible to processor(s) 704, render computing device 700 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 700 also may include read only memory (ROM) 708 or other static storage device coupled to bus 702 for storing static information and instructions for processor(s) 704.

One or more mass storage devices 710 may be coupled to bus 702 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 702 to display 712, such as a liquid crystal display (LCD) or other electronic visual display, for displaying information to a computer user. In some configurations, a touch sensitive surface incorporating touch detection technology (e.g., resistive, capacitive, etc.) may be overlaid on display 712 to form a touch sensitive display for communicating touch gesture (e.g., finger or stylus) input to processor(s) 704.

An input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in some configurations, such as the configuration depicted in FIG. 8, one or more of display 712, input device 714, and cursor control 716 are external components (i.e., peripheral devices) of computing device 700, some or all of display 712, input device 514, and cursor control 716 are integrated as part of the form factor of computing device 700 in other configurations.

Functions of the disclosed systems, methods, and modules may be performed by computing device 700 in response to processor(s) 704 executing one or more programs of software instructions contained in main memory 706. Such instructions may be read into main memory 706 from another storage medium, such as storage device(s) 710. Execution of the software program instructions contained in main memory 706 cause processor(s) 704 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor(s) 704 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor(s) 704 retrieves and executes the instructions. The instructions received by main memory 706 may optionally be stored on storage device(s) 710 either before or after execution by processor(s) 704.

Computing device 700 also may include one or more communication interface(s) 718 coupled to bus 702. A communication interface 718 provides a two-way data communication coupling to a wired or wireless network link 720 that is connected to a local network 722 (e.g., Ethernet network, Wireless Local Area Network, cellular phone network, Bluetooth wireless network, or the like). Communication interface 718 sends and receives electrical, electromagnetic, or optical signals that carry digital data streams representing various types of information. For example, communication interface 718 may be a wired network interface card, a wireless network interface card with an integrated radio antenna, or a modem (e.g., ISDN, DSL, or cable modem).

Network link(s) 720 typically provide data communication through one or more networks to other data devices. For example, a network link 720 may provide a connection through a local network 722 to a host computer 724 or to data equipment operated by an Internet Service Provider (ISP) 726. ISP 726 in turn provides data communication services through the world wide packet data communication network now commonly referred to as the "Internet" 728. Local network(s) 722 and Internet 728 use electrical, electromagnetic or optical signals that carry digital data streams. The signals through the various networks and the signals on network link(s) 720 and through communication interface(s) 718, which carry the digital data to and from computing device 700, are example forms of transmission media.

Computing device 700 can send messages and receive data, including program code, through the network(s), network link(s) 720 and communication interface(s) 718. In the Internet example, a server 730 might transmit a requested code for an application program through Internet 728, ISP 726, local network(s) 722 and communication interface(s) 718.

The received code may be executed by processor 704 as it is received, and/or stored in storage device 710, or other non-volatile storage for later execution The above-described example computer hardware is presented for the purpose of illustrating certain underlying computer components that may be employed for implementing the subject innovations. This computer hardware, when executing software that causes the computer hardware to perform the various processes discussed herein, becomes a special purpose computer that performs particular useful applications.

The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Unless specifically stated otherwise, the term "may" is used to express one or more non-limiting possibilities. Headings and subheadings, if any, are used for convenience only and do not limit the subject innovations.

A phrase, for example, an "aspect", an "embodiment", a "configuration", or an "implementation" does not imply that the aspect, the embodiment, the configuration, or the implementation is essential to the subject innovations or that the aspect, the embodiment, the configuration, or the implementation applies to all aspects, embodiments, configurations, or implementations of the subject innovations. A disclosure relating to an aspect, an embodiment, a configuration, or an implementation may apply to all aspects, embodiments, configurations, or implementations, or one or more aspects, embodiments, configurations, or implementations. A phrase, for example, an aspect, an embodiment, a configuration, or an implementation may refer to one or more aspects, embodiments, configurations, or implementations and vice versa.

The invention claimed is:

1. A method, performed by one or more processors, the method comprising:
    receiving, over a data network from a particular application of the data network, instructions for performing a read or write request for data, the instructions being received in an enforcing application of the data network configured to enforce one or more policies for reading and writing data to a database, each of the particular application and the enforcing application comprising a different respective microservice of a network of microservices;
    sending the read or write request from the enforcing application to a transaction manager for providing transactions for a key-value store of the database, the request being in accordance with the one or more policies to be enforced by the enforcing application; and
    receiving, at the enforcing application from the transaction manager, a response message based on operations performed by the transaction manager in response to the read or write request, wherein the enforcing, by the enforcing application, one or more policies comprises:
        determining a number of key-value pairs stored in the database;
        determining, from different schemas, one or more accepted schemas to be conformed with based on the determined number of key-value pairs, and based on respective particular efficiencies of each of the different schemas in using computational resources according to the determined number of key-value pairs;
        enforcing the one or more accepted schemas, comprising:
            in response to determining that a schema of the instructions conforms with one of the accepted schemas, transmitting the instructions to the transaction manager; and
            in response to determining that the schema of the instructions fails to conform with any of the accepted schemas, stopping the instructions from passing to the transaction manager;
        determining whether to access a secondary memory based on a file size of data to be written, the secondary memory being inaccessible to the transaction manager; and
        in response to determining to access the secondary memory:
            writing the data to the secondary memory; and
            sending a location of the data in the secondary memory and an instruction to the transaction manager to store, in the key-value store of the database, the location as a value of a key-value pair.

2. The method of claim 1, wherein the enforcing application accesses one or more policy data objects defining the policies to be enforced.

3. The method of claim 1, wherein an error message is returned to a computer system associated with the instructions if the instructions do not conform to the one or more schemas in the one or more policy data objects.

4. The method of claim 2, wherein:
    one or more of the policy data objects define a predetermined file size; and
    if the instructions are associated with writing a first file that is under said predetermined file size, the sending the write request comprises sending the write request and the first file to the transaction manager for storing the first file as a value in the key-value store.

5. The method of claim 2, wherein one or more of the policy data objects define a predetermined file size, and wherein if the instructions are associated with writing a second file that is over said predetermined file size, the method further comprises storing the second file in the secondary memory separate from the database and sending the write request comprises sending the write request and a second location of the second file in the secondary memory to the transaction manager for storing the second location of the second file as a second value in the key-value store.

6. The method of claim 5, wherein receiving the response message comprises receiving, from the transaction manager, a key corresponding to the value in the key-value store.

7. The method of claim 6, wherein if a subsequent received instruction is associated with reading the second file, a subsequent step comprises sending a read request to the transaction manager, the read request including the key of the second file, receiving from the transaction manager the second location of the second file corresponding to the key, and retrieving the second file from the secondary memory using said location, the subsequent instruction being received subsequent to the instructions being received, and the subsequent step being subsequent to the subsequent instruction being received.

8. The method of claim 7, wherein the instructions are received from one or more other applications of the data network, the other applications being at least partly configured to read and/or write data to the database via the transaction manager and key-value store, and wherein the method further comprises receiving one or more updated policies to be enforced by the enforcing application when receiving instructions from the one or more other applications.

9. The method of claim 8, further comprising storing a range-scan table for caching an index associated with a subset of the keys in the key-value store.

10. The method of claim 9, wherein the subset of keys comprise shared key parts.

11. The method of claim 9, wherein the subset of keys is determined based on prior range-scan requests.

12. A non-transitory computer-readable storage medium including instructions that, when executed by at least one processor of a computing system, cause the computing system to perform a method comprising:

receiving, over a data network from a particular application of the data network, instructions for performing a read or write request for data, the instructions being received in an enforcing application of the data network configured to enforce one or more policies for reading and writing data to a database, each of the particular application and the enforcing application comprising a different respective microservice of a network of microservices;

sending the read or write request from the enforcing application to a transaction manager for providing transactions for a key-value store of the database, the request being in accordance with the one or more policies to be enforced by the enforcing application; and receiving, at the enforcing application from the transaction manager, a response message based on operations performed by the transaction manager in response to the read or write request, wherein the enforcing, by the enforcing application, one or more policies comprises:

determining a number of key-value pairs stored in the database;

determining, from different schemas, one or more accepted schemas to be conformed with based on the determined number of key-value pairs, and based on respective particular efficiencies of each of the different schemas in using computational resources according to the determined number of key-value pairs;

enforcing the one or more accepted schemas, comprising:

in response to determining that a schema of the instructions conforms with one of the accepted schemas, transmitting the instructions to the transaction manager; and in response to determining that the schema of the instructions fails to conform with any of the accepted schemas, stopping the instructions from passing to the transaction manager;

determining whether to access a secondary memory based on a file size of data to be written, the secondary memory being inaccessible to the transaction manager; and in response to determining to access the secondary memory:

writing the data to the secondary memory; and sending a location of the data in the secondary memory and an instruction to the transaction manager to store, in the key-value store of the database, the location as a value of a key-value pair.

13. The non-transitory computer-readable storage medium of claim 12, wherein the enforcing application accesses one or more policy data objects defining the policies to be enforced.

14. The non-transitory computer-readable storage medium of claim 12, wherein an error message is returned to a computer system associated with the instructions if the instructions do not conform to the one or more schemas in the one or more policy data objects.

15. A system for managing software bugs in a data processing system, the system comprising:

one or more physical processors;

a memory storing instructions that, when executed by the one or more physical processors, cause the system to:

receiving, over a data network from a particular application of the data network, instructions for performing a read or write request for data, the instructions being received in an enforcing application of the data network configured to enforce one or more policies for reading and writing data to a database, each of the particular application and the enforcing application comprising a different respective microservice of a network of microservices;

sending the read or write request from the enforcing application to a transaction manager for providing transactions for a key-value store of the database, the request being in accordance with the one or more policies to be enforced by the enforcing application; and receiving, at the enforcing application from the transaction manager, a response message based on operations performed by the transaction manager in response to the read or write request, wherein the enforcing, by the enforcing application, one or more policies comprises:

determining a number of key-value pairs stored in the database;

determining, from different schemas, one or more accepted schemas to be conformed with based on the determined number of key-value pairs, and based on respective particular efficiencies of each of the different schemas in using computational resources according to the determined number of key-value pairs;

enforcing the one or more accepted schemas, comprising:

in response to determining that a schema of the instructions conforms with one of the accepted schemas, transmitting the instructions to the transaction manager; and in response to determining that the schema of the instructions fails to conform with any of the accepted schemas, stopping the instructions from passing to the transaction manager;

determining whether to access a secondary memory based on a file size of data to be written, the secondary memory being inaccessible to the transaction manager; and in response to determining to access the secondary memory:

writing the data to the secondary memory; and sending a location of the data in the secondary memory and an instruction to the transaction manager to store, in the key-value store of the database, the location as a value of a key-value pair.

16. The system of claim 15, wherein the enforcing application accesses one or more policy data objects defining the policies to be enforced.

17. The system of claim 15, wherein an error message is returned to a computer system associated with the instructions if the instructions do not conform to the one or more schemas in the one or more policy data objects.

* * * * *